(12) United States Patent
Owen et al.

(10) Patent No.: US 6,421,007 B1
(45) Date of Patent: Jul. 16, 2002

(54) METHOD AND APPARATUS FOR DETERMINING A DIRECTION OF ARRIVAL OF A SIGNAL

(75) Inventors: Raymon Owen, Bath (GB); Jun Xiang, Beijing (CN)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/674,120
(22) PCT Filed: Apr. 5, 1999
(86) PCT No.: PCT/EP99/03097
§ 371 (c)(1),
(2), (4) Date: Dec. 19, 2000
(87) PCT Pub. No.: WO99/57574
PCT Pub. Date: Nov. 11, 1999

(30) Foreign Application Priority Data

May 6, 1998 (GB) .............................................. 9809546

(51) Int. Cl.$^7$ ................................................ G01S 5/02
(52) U.S. Cl. ...................................................... 342/417
(58) Field of Search .................................. 342/417, 379

(56) References Cited

U.S. PATENT DOCUMENTS 6,075,484 A * 6/2000 Daniel et al. ................ 342/372
6,239,747 B1 * 5/2001 Kaminski .................... 342/442
6,240,098 B1 * 5/2001 Thibault et al. ............. 370/431

\* cited by examiner

Primary Examiner—Theodore M. Blum
(74) Attorney, Agent, or Firm—Kenneth A. Haas

(57) ABSTRACT

The invention provides a method and apparatus for determining the direction of a signal such as for example a received radio signal in a cellular mobile communication system. At lest two antenna arrays (10, 12) are connected to associated processors (14, 16) for extracting the desired signal and two independent direction of arrival estimates are determined in associated direction estimators (18, 20). A similarity testing unit (22) determines the direction of arrival and the accuracy of this estimate from the difference between the two estimates. A feature of the invention is controlling the beam form of a downlink signal in response to the direction estimate and the determined accuracy.

14 Claims, 1 Drawing Sheet

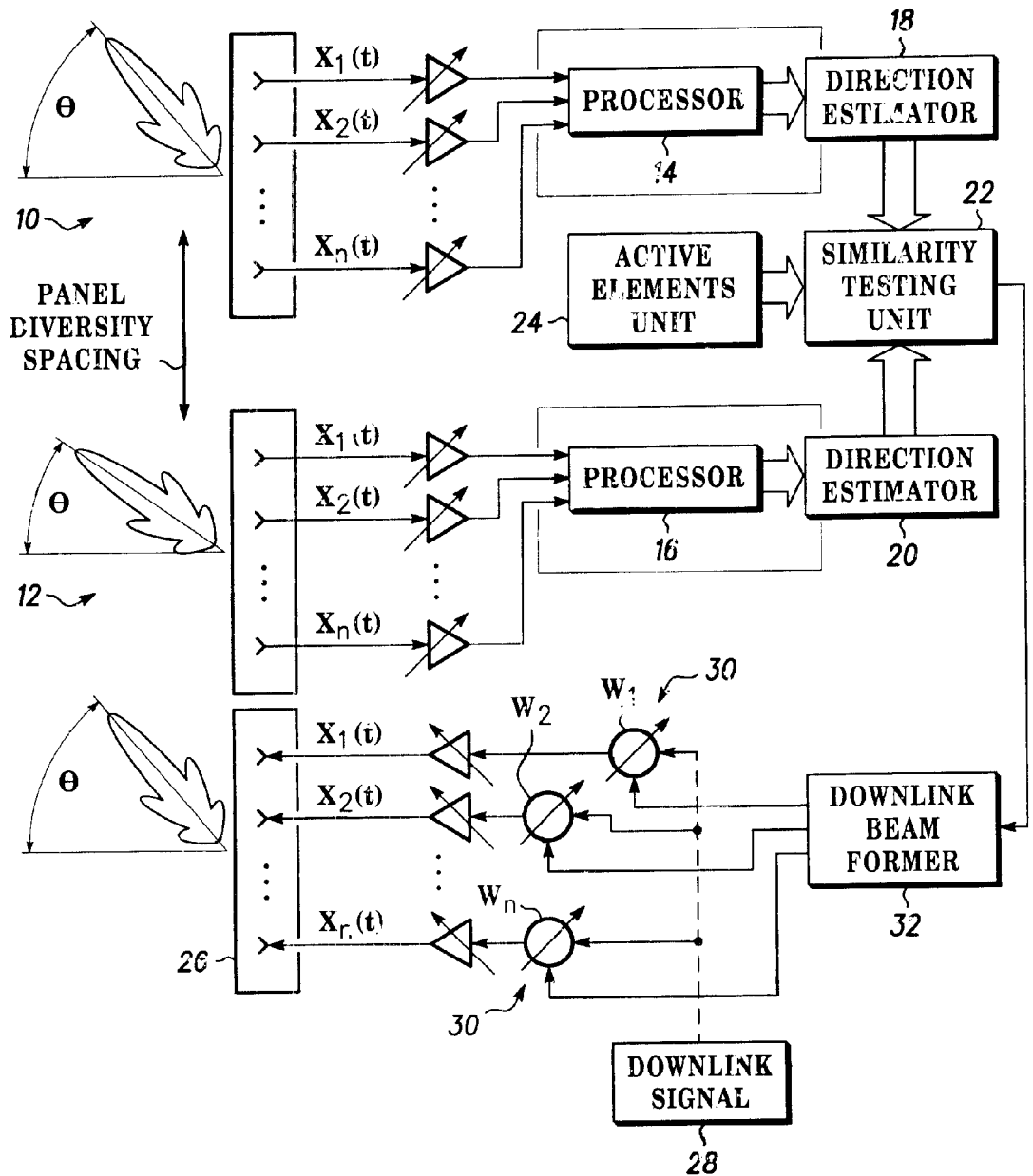

METHOD AND APPARATUS FOR DETERMINING A DIRECTION OF ARRIVAL OF A SIGNAL

FIELD OF THE INVENTION

The present invention relates to a method and apparatus for determining a direction of arrival of a signal. The invention is applicable but not limited to finding the direction of arrival of an electromagnetic signal such as a radio signal.

BACKGROUND OF THE INVENTION

In many applications it is of interest to determine the direction of arrival of a signal. An example is in a radio communication system wherein the determination of a direction of arrival of a received signal from one communication unit can be used to maximise the power transmitted in that direction by a second communication unit. This allows optimisation of the signal level of the radio communication signal transmitted from the second communication unit when received by the first communication unit.

An example of a radio communication system wherein this method can be applied is a cellular mobile communication system such as the Global System for Mobile Communication. In a cellular mobile communication system each of the mobile stations communicate with typically a fixed base station. Communication from the mobile station to the base station is known as uplink and communication from the base station to the mobile station is known as downlink. The total coverage area of the system is divided into a number of separate cells each covered by a single base station. The cells are typically geographically distinct with an overlapping coverage area. As a mobile station moves from the coverage area of one cell to the coverage area of another cell, the communication link will change from being between the mobile station and the base station of the first cell to being between the mobile station the base station of the second cell. This is known as a handover.

Specifically, some cells may lie completely within the coverage of other larger cells. These are known as hierarchical cells and an example is the so called microcells which are used to provide a high traffic capacity in high traffic area. Typically the microcells are small and a large number of cells can be implemented in a limited area. A mobile station moving into the microcell will be handed over from the overlaying cell, known as the macrocell. This frees up resource from the macrocell and hierarchical cell thus provide the possibility of a large coverage area combined with high traffic capacity.

All base stations are interconnected by a network. This network comprises communication lines, switches, interfaces to other communication networks and various controllers required for operating the network. A call from a mobile station is routed through this network to the destination specific for the call. If the call is between two mobile stations of the same communication system, it will be routed through the network to the base station currently serving the other mobile station currently. A connection is thus established between the two serving cells through the network. Alternatively, if the call is between a mobile station and a telephone connected to the Public Switched Telephone Network (PSTN) the call is routed from the serving base station to the interface between the cellular mobile communication system and the PSTN. It is then routed from the interface to the telephone by the PSTN.

A cellular mobile communication system is allocated a frequency spectrum for the radio communication between the mobile stations and the base stations. This spectrum must be shared between all mobile station simultaneously using the system. In GSM and similar systems, this is achieved by dividing the spectrum into a number of frequency channels. In GSM each of the frequency channels are furthermore divided into eight distinct time slots. By allocating a time slot to each active mobile station, eight mobile stations can thus be served by each frequency channel. This approach is known as Time Division Multiple Access (TDMA). Each cell is allocated a number of frequency channels. As the number of frequency channels are limited, the same frequency channels are typically allocated to more than one cell. This is known as frequency re-use and the tighter the frequency reuse, i.e. the closer together the same frequency channel can be used, the higher is the achievable traffic capacity of the system.

The quality of the radio communication between the mobile station and the base station is determined by the signal to noise level of the signals. Other base stations and mobile stations generate interference which increases the noise level and thus reduced the quality. In order to attain an acceptable quality level, the interference must be kept sufficiently low. The interference can be generated from transmissions on the same frequency channel which is known as so-called interference. Alternatively, it can be generated from transmissions on adjacent channels as it is not possible prevent unwanted emissions outside the allocated frequency channel. This interference is known as adjacent channel interference. As the interference level reduces with increasing distance to the interferer, the interference level will be increased for tighter frequency re-use. Today's cellular communication system incorporates other measures to minimise interference levels such as power control which reduces the power transmitted to the lowest level that will provide adequate link quality.

Another important method of reducing interference is by using directional antennas whereby power is mainly transmitted in the direction for optimal signal quality at the desired receiver. When receiving, a directional antenna will attenuate the interference received from the other directions thereby allowing the transmitter to transmit at lower power.

Directional antennas are often physically large and expensive and therefore impractical at the mobile station, and most directional antennas are deployed at the base stations. The most suitable directional antennas are antenna arrays consisting of a plurality of antenna elements. By individually adjusting a relative phase correction for each element the antenna array will have a directional beam pattern. The operation of antenna arrays are described in 'Introduction to adaptive arrays' by Monzingo and Miller, 1980, Wiley Publishing.

A known method for reducing interference in a cellular communication system is to determine a direction of arrival of an uplink signal received by an antenna array, and transmitting the downlink signal in the direction determined. However, the benefit of the method is very dependent on the accuracy and reliability of the direction of arrival estimate obtained. Known methods for estimating a direction of arrival have a high degree of unreliability and a system for improving the reliability and provide a way of determining the reliability of the estimate is desirable.

SUMMARY OF THE INVENTION

The current invention seeks to provide a method and apparatus for improving the reliability and accuracy of an estimate of a direction of arrival and to determine the reliability of the obtained estimate.

According to an aspect of the present invention, there is provided a method of determining a direction of arrival of a received signal including the steps of obtaining a first estimate of a direction of arrival of the received signal from a first sensor, obtaining at least second estimate of a direction of arrival of the received signal from at least a second sensor and characterised by comprising the step of, determining a direction of arrival estimate of the received signal as a function of both said first and at least second estimate.

Preferably, the first and at least second estimate represent the direction of arrival estimate when the difference between the first and at least second estimate is below a threshold.

According to a feature of the present invention a downlink signal is transmitted in the direction of the direction of arrival estimate in a cellular communication system.

According to another aspect of the present invention, there is provided an apparatus for determining a direction of arrival of a received signal including a first estimator generating a first estimate of a direction of the received signal from a first sensor, at least a second estimator generating a second estimate of a direction of the received radio signal from a second sensor and characterised by including, a controller determining a direction of arrival estimate of the received radio signal as a function of both said first and at least second estimate.

BRIEF DESCRIPTION OF THE DRAWING

An embodiment of the present invention is described below, by way of example only, with reference to the accompanying drawing, in which:

FIG. 1 is a block schematic of a preferred embodiment of an apparatus for determining a direction of arrival and transmitting a downlink signal in accordance with the invention.

DETAILED DESCRIPTION OF A PREFERRED EMBODIMENT

Referring to FIG. 1, the embodiment of an apparatus for determining a direction of arrival and transmitting a downlink signal is shown.

FIG. 1 shows two antenna arrays 10, 12 of conventional form. The two antenna arrays 10, 12 are preferably arranged to be substantially uncorrelated typically by being spaced from one another by a suitable diversity spacing or by using polarisation diversity, as is well known in the art.

Each antenna array 10, 12 is coupled to a respective processor 14, 16 which extracts the incoming uplink signal and determines therefrom the principal signal component from the received reflections. These signal processors can be of conventional type. Each signal processor is coupled to a respective direction estimator 18, 20 operable to determine the estimated direction of arrival $\theta_u$ of the uplink signal or of its principal component. One suitable technique is the 'Beamforming Algorithm' which is well known in the art.

The system includes a similarity testing unit 22 coupled to each direction estimator 18, 20 and preferably also to a unit 24 operable to indicate the number of active antenna elements of each antenna array 10, 12.

An output of the similarity testing unit 22 is an estimate of the direction of arrival of the uplink signal and optionally an estimate of the reliability of this estimate.

At the downlink transmitter side, there is provided an adaptive antenna array 26 through which a downlink signal 28 can be transmitted. Weighting units 30, controlled by the downlink beam former 32, are provided for each of the antenna elements for beam steering purposes as is known in the art. According, to the invention the direction and preferably also beamwidth will be set in response to the direction and or quality of the direction of arrival estimate of the uplink signal.

In use, each set of antenna array 10 (12), processor 14 (16) and direction estimator 18 (20) extracts the uplink signal or principal component thereof, and determines therefrom the estimated direction of arrival of the signal or principal signal component. Typically, the direction estimates from the two sets of antenna arrays differ.

According to one feature of the invention, an angle of arrival is determined by weighting the direction estimates from each of the antenna arrays according to either the power level or the signal to noise ratio of the uplink signal as received in each of the two antenna arrays respectively. Specifically, the power level or signal to noise ratio in each branch can be evaluated and the direction of arrival determined as the direction estimate corresponding to the highest level. This will provide significant improvement of the direction of arrival determination in a fading environment where the radio signal is often in a deep fade in one of the antenna arrays but rarely in both arrays.

The extraction of the uplink signal can be based on a known characteristic. Preferably, the uplink signal will contain a known data pattern and the power or signal to noise level can be estimated by correlating the received signal with this known data pattern. This is well known from GSM receivers where correlation between a known midamble data pattern and the received signal is used to estimate the channel characteristics for the wanted mobile, which is similar to extracting the energy received from the wanted mobile.

According to a different aspect of the invention the direction of arrival determination is based on directly comparing the direction estimates rather than on comparing the signal levels received in the two branches.

Preferably the similarity testing unit 22 is arranged to compare the two direction estimates from the two antenna arrays 10,12. If the estimates are found to be substantially similar either estimate is considered to be a valid estimate of the direction of arrival of the uplink signal. The similarity testing unit 22 can therefore provide either of the two estimates or preferably an averaged value to the downlink beam former 32. The comparison can in the simplest form obtain the difference between the two direction estimates and compare this to a threshold value. When the difference is below the threshold value the estimates are substantially similar and therefore considered to provide a reliable direction of arrival.

Preferably, the similarity testing unit 22 not only generates a direction of arrival estimate but also an indication of how correlated the first and second estimates are, for example as the difference between the estimates. Based on this correlation the downlink beamformer will adjust the beamwidth of the downlink signal. For example, as the correlation decreases this is an indication that the reliability of the direction of arrival estimate is decreasing. The beamformer will consequently form a wider beam ensuring that the mobile station is within the extended angle. Specifically, the beam former may form a non-directional beam pattern when the correlation between the estimates is above a given threshold.

The averaging duration of the angle of arrival estimates are very important for the performance of the system. The shorter duration, the more unreliable and noisy the estimates become. The longer the duration, the slower the response time to changes in the direction of arrival of the incoming signal. The rate of change in direction of arrival and the signal to noise level vary significantly in a mobile communication system, mainly because of the different speeds at which mobile stations may be moving. According to a feature of the communication system, the averaging duration is changed in response to the determined reliability of the direction of arrival estimate i.e. in response to the correlation between the first and second estimate. Preferably, the averaging duration is increased for decreasing correlation and decreased for increasing correlation.

In the general approach, a continuous value for the direction arrival is provided to the downlink beam former 32 together with an indication of the reliability of the estimate. The downlink beam former 32 will form a beam in the direction of arrival with a beamwidth determined in response to the reliability of the current value.

In a specific example operation of the system is as follows with reference to FIG. 1:

1. The number N of active elements of the antenna arrays 10, 12 is determined and from this the error threshold for an N-dimensional linear antenna array. For example, for a 4-element antenna array, the 3 dB bandwidth is approximately 2°, thus a pointing error to the actual received maximal energy in the downlink signal of ±10° is acceptable. The error threshold is thus set at ±10°.

2. In the first instance, the direction of arrival estimate is determined independently for each receiver antenna array branch. (These are shown as spatial diversity panels but could equally be dual-polarisation diversity panels). The covariance matrix estimate, used in the direction of arrival process is averaged over a short period, for example one frame. Thus, the two estimates may be quite different.

3. The uplink and downlink peak directional estimates are recalculated with a longer covariance matrix, for example over successive frames 1 to K. It is then checked to see whether the difference between the uplink and downlink directions is less than the convergence bounds imposed by the aperture of the N-dimensional antenna array. If this is not the case, the covariance matrix is recalculated with a longer average. However, if convergence is reached, the direction estimate of one or both of the diversity panels is used to formulate the downlink beam. The averaging period is then reset to zero and the process begins again.

In this embodiment, the averaging performed in determining the angle of arrival is thus dynamically adjusted to ensure a sufficiently reliable direction of arrival.

In one embodiment, the system may use a moving average of convergences to move the beams. Similarly, the error threshold may be variable, for example to take into account particular uplink characteristics or the number of antenna elements used in the antenna arrays.

In some embodiments, more than two antenna arrays may be provided to generate more than two directional estimates.

The invention is applicable to a cellular communication system where it can provide better signal to noise performance and reduced interference. The downlink beam derived from the uplink measured directions, are steered in the correct directions. Moreover, there can be better interference performance because downlink beams are not pointing in the incorrect directions, causing more interference to neighbouring cells, during the convergence period of the direction estimates. In addition, signal to noise performance is independent of mobile speed when varying convergence periods are used.

It will be obvious to the person skilled in the art that the invention will not be limited to a cellular communication system but will be applicable to any field where the direction of arrival of a signal is to be determined. These applications include determining the direction of arrival of for example an infrared or acoustic signal.

What is claimed is:

1. A method of determining a direction of arrival of a received signal including the steps of:
   obtaining a first estimate of a direction of arrival of the received signal from a first sensor (10),
   obtaining at least a second estimate of the direction of arrival of the received signal from at least a second sensor (12), and characterised by comprising the step of determining a direction of arrival estimate of the received signal as a function of both the first and at least second estimate.

2. A method according to claim 1 wherein the step of determining the direction of arrival estimate of the received signal is characterised by weighting the first and at least second estimate according to the power level of the received radio signal received by the first and second sensor (10, 12) respectively.

3. A method according to claim 1 wherein the step of determining the direction of arrival estimate of the received signal is characterised by weighting the first and at least second estimate according to the signal to noise ratio of the received signal received by the first and at least second sensor (10, 12) respectively.

4. A method according to claim 2 or 3 wherein a known characteristic of the received signal is used for identifying the received signal.

5. A method according to claim 1 wherein the step of determining the direction of arrival estimate is characterised by a comparison of the first and at least second estimate, and determining that the first and at least second estimate represent the direction of arrival when the first and at least second estimate are substantially similar.

6. A method according to claim 5 wherein the comparison is performed by determining a difference between the first and at least second estimate and determining that the first and at least second estimate represent the direction of arrival when the difference between the first and at least second estimate is below a threshold.

7. A method of transmitting a downlink signal in a radio communication system including the steps of determining a direction of a received radio signal according to claim 1, and transmitting a downlink signal in the direction of arrival determined.

8. A method of transmitting a downlink signal in a radio communication system according to claim 7 wherein a beamwidth of the downlink signal is determined in response to a correlation between the first and at least second estimate.

9. A method according to claim 1 wherein the averaging duration of the first and at least second estimate is determined in response to a correlation between the first and second estimate.

10. A method according to claim 7 used in a cellular communication system.

11. An apparatus for determining a direction of arrival of a received signal including:

a first estimator (18) generating a first estimate of a direction of the received signal from a first sensor (10), at least a second estimator (20) generating a second estimate of the direction of the received signal from a second sensor (12), and characterised by including, a controller for determining a direction of arrival estimate of the received radio signal as a function of both said first and at least second estimate.

12. An apparatus as claimed in claim 11 where the received signal is an electromagnetic signal.

13. An apparatus as claimed in claim 12 further comprising a transmitter (32) for transmitting a downlink radio signal in the determined direction of arrival.

14. An apparatus as claimed in claim 13, wherein a bandwidth of the downlink signal is determined in response to a correlation between said first and at least said second estimate.

* * * * *